March 14, 1939.　　　C. D. KEATON　　　2,150,801
ELECTRIC COFFEE MAKER
Filed Dec. 17, 1937　　　2 Sheets-Sheet 1
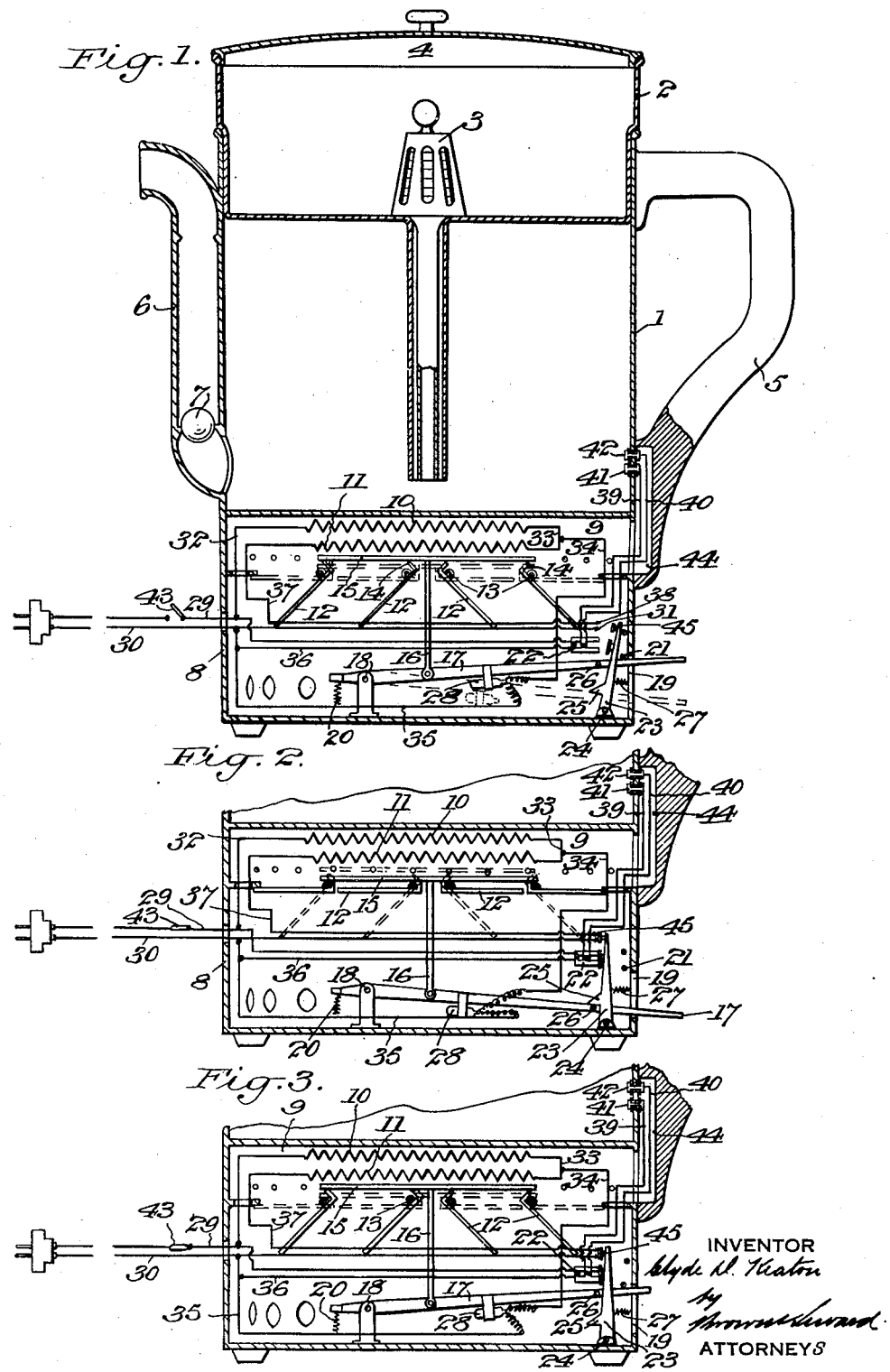

March 14, 1939. C. D. KEATON 2,150,801
ELECTRIC COFFEE MAKER
Filed Dec. 17, 1937 2 Sheets-Sheet 2

INVENTOR
Clyde D. Keaton
BY
ATTORNEYS

Patented Mar. 14, 1939

2,150,801

UNITED STATES PATENT OFFICE 2,150,801

ELECTRIC COFFEE MAKER

Clyde D. Keaton, Long Island City, N. Y., assignor to Stanley S. Tumbridge, Brooklyn, N. Y.

Application December 17, 1937, Serial No. 180,263

8 Claims. (Cl. 219—43)

The object of my invention is to provide an electric coffee maker of the vacuum type in which automatic means, under the control of the contents of the coffee pot, is employed to cut off the heat when the coffee reaches a predetermined point in its making and to reestablish a part of the heat after the coffee is made, to maintain the coffee hot as long as desired.

A further object of my invention is to provide automatic means for hastening the cooling of the electric heating units when the current is cut off therefrom.

My invention comprises, generally, an electric coffee maker in which the lower vessel of the coffee pot is formed integral with the heater casing, and in which the heater is provided with a heating chamber having a heating unit therein, said heating unit comprising a plurality of heating elements, the circuit through the heating unit being completed to give high heat in one of said elements by the manual closing of a switch in the circuit.

My invention further comprises an electric coffee maker in which the circuit through the heating unit is cut off when the water in the lower chamber of the coffee pot is forced upwardly into the upper chamber thereof through a filter of well known or approved form.

My invention further comprises means whereby the circuit is completed through the heating unit to give low heat when the coffee has been drawn back into the lower chamber of the coffee pot to keep the coffee hot as long as desired.

My invention also comprises an automatic ventilator for air cooling the heating unit when the circuit therethrough has been broken, said ventilator being closed when the current is passing through the heating unit to give high heat in one of said heating elements.

My invention still further comprises a coffee maker in which a hand lever is used to operate a switch in the circuit to complete the circuit through the unit to give high heat in one of said heating elements, said hand lever being under the control of the contents of the coffee pot for throwing the lever to open the switch and thereby open the circuit through the heating unit.

Practical embodiments of my invention are represented in the accompanying drawings, in which—

Fig. 1 represents a detail vertical central section through one embodiment of my invention in which two spaced terminals are located in the lower chamber of the coffee pot, said terminals being electrically connected and disconnected as the water rises and falls in the lower chamber of the coffee pot;

Fig. 2 represents a similar section through a portion of my invention, showing the parts in position for completion of the circuit to give high heat in one of the heating elements;

Fig. 3 represents a similar section through a portion of my invention, showing the parts in position for completion of the circuit through the heating unit to give low heat;

Figure 4:
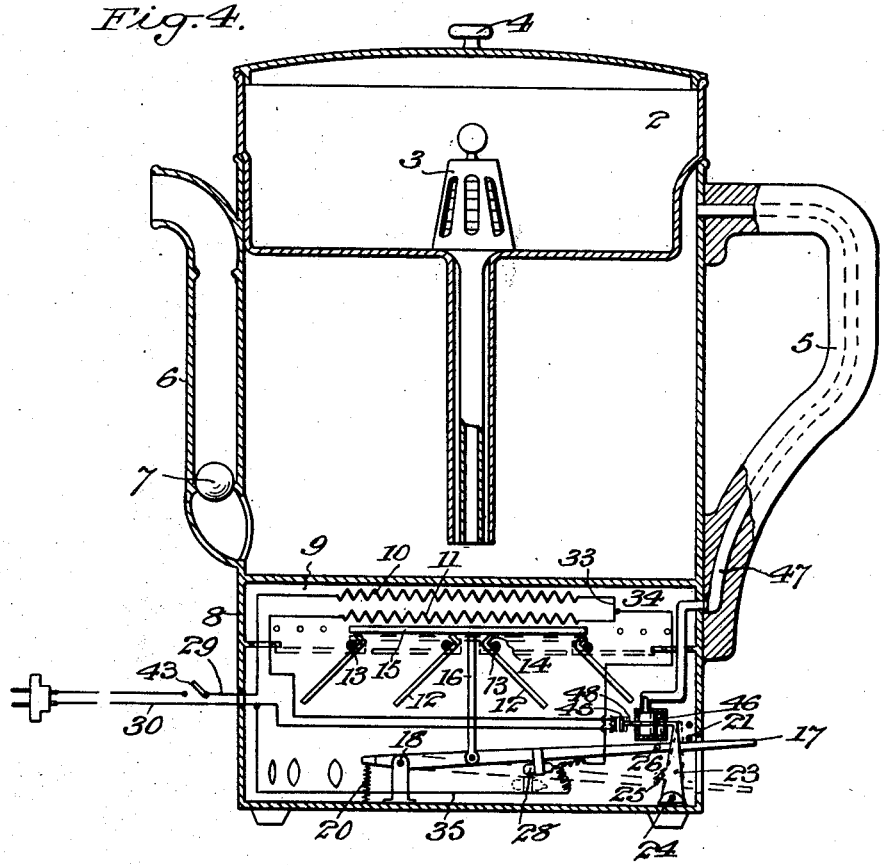
Fig. 4 represents a similar section through a second embodiment of my invention, in which the rise and fall of steam pressure in the lower chamber of the coffee pot controls the opening and closing of the circuit.
Figure 5:
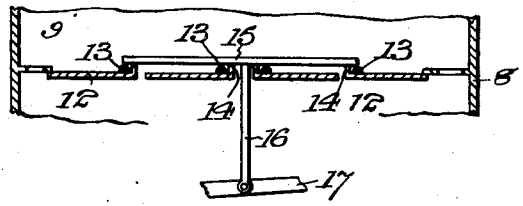
Fig. 5 represents a detail side view of a central section of the air controlling shutters for the heating chamber, in a closed position.

The coffee pot comprises a lower vessel 1, an upper vessel 2 nested therein, and a filter 3 of any well known or approved form for establishing communication between the lower and upper chambers of said vessel. The upper vessel 2 may be provided with a removable cover 4. The lower vessel may be provided with a handle 5 and a pouring spout 6, within which pouring spout is seated a weighted valve 7, in the present instance of the ball type, for preventing the escape of steam from the lower chamber through the said spout.

The electric heater casing of the coffee maker is denoted as a whole by 8, and it is formed integral with the lower vessel 1 of the coffee pot. The top of the heater casing has a heating chamber 9 in which the heating elements 10, 11, connected in series, are located.

Shutters 12 pivoted at 13 serve to open and close the open bottom of this heating chamber 9. These shutters are held closed against their tendency to open by gravity by providing the shutters at one side of their pivots 13 with upturned lips 14 engaged by a horizontal plate 15 connected by an upright rod 16 to a horizontally disposed hand lever 17 pivoted at 18 on the bottom of the heater 8. Said lever 17 extends through a slot 19 in casing 8 to permit manual operation thereof. A spring 20 tends to lift lever 17 to the limit of its upward movement against a stop 21. This hand lever 17 is releasably held at the limit of its downward movement by an electromagnet 22 and its trip lever 23, which lever is pivoted at 24 to the bottom of the heater casing 8. This trip lever 23 is provided with a shoulder 25 which engages a projection 26 on the hand lever 17 when the trip lever 23 is swung to the limit of its forward movement by the energization of the electromagnet 22. A spring 27 serves to swing the lever 23 outwardly when the electromagnet 22 is partially deenergized, to release the projection 26 from the shoulder 25 of said trip lever 23.

A switch 28, in the present instance, a mercury switch, is mounted on the hand lever 17 in position to close the circuit through the switch when the hand lever is in its depressed position, and to open the circuit through the switch when said lever is in its raised position.

The main line wire 29 leads into the heater to one coil of the electromagnet 22. The other main line wire 30 leads into the heater to the open terminal 31. Wire 32 leads from main line wire 29 to heating element 10. Wire 33 connects heating elements 10 and 11 in series. Wire 34 leads from wire 33 to one terminal of mercury switch 28. Wire 35 leads from the other terminal of mercury switch 28 back into main line wire 30. Wire 36 leads from wire 35 to the opposite end of the coil of electromagnet 22 to which wire 29 is led. Wire 37 leads from heating element 11 to an open terminal 38. Wires 39 and 40, located partially in a recess 44 in handle 5, lead from electrodes 41 and 42 respectively, to the second coil of electromagnet 22.

Electrodes 41, 42 are located within the lower chamber of the coffee pot, the electrical circuit at these points being made and broken by the water or liquid coffee as the case may be, as it rises and falls within the said lower chamber to points above and below the terminals 41 and 42.

A manually operated switch 43 is placed in the main line leading to the heater from a source of current supply, not shown herein.

In the form shown in Fig. 4, the trip lever 23 for the hand lever 17 is pressure controlled by a pump, the interior of which pump on one side of the piston 46 which is carried by the trip lever 23 is open to pressure within the lower chamber of the coffee pot through the passage 47 which leads from the pump to the upper end of the lower chamber of said coffee pot. Trip lever 23 carries a piston rod 48 having a contact plate 45 adapted to close the circuit through both elements by contact with terminals 31, 38, to give low heat. The movement of trip lever 23 to complete the circuit through terminals 31, 38 by means of contact plate 45 is controlled by suction set-up in the lower chamber of the coffee pot when said lower chamber is cooled after the high heat has been automatically shut off and the ventilator shutters 12 automatically opened. The liquid coffee is drawn back into the lower chamber of the coffee pot through filter 3, when the pressure in said lower chamber is reduced through the cooling of the chamber, as above stated.

In the form shown in Fig. 1, the operation is as follows:

The upper and lower chambers of the coffee pot are supplied with ground coffee and water respectively. The switch 43 in the main supply line is manually closed. This completes the circuit through both coils of electromagnet 22, thereby completely energizing same. This causes trip lever 23 to move in against the tension of spring 27 to close open contacts 31, 38 by means of a contact plate 45 carried by trip lever 23. With the parts in these positions, the circuit is completed through both heating elements 10, 11, connected in series, giving low heat. Hand lever 17 is then depressed and snapped by shoulder 25 of lever 23 in order that said shoulder 25 may releasably engage projection 26 on said lever 17 and hold same in its depressed position. This downward movement of hand lever 17 closes shutters 12 and tilts mercury switch 28, closing the circuit therethrough. The circuit will then be completed through wires 29, 32, heating element 10, wires 33, 34, mercury switch 28, and wires 35 and 30. (See Fig. 2.)

It will be noted that heating element 11 will be shunted out since elements 10 and 11 are of substantially equal resistance.

Since practically the entire current load passes through the single heating element 10 only, the water in the lower chamber of the coffee pot will be subjected to the maximum heat obtainable from the arrangement of the heating elements.

After the water has been boiled and a sufficient quantity of it has passed up into the upper chamber through filter 3, the water level will fall below the terminals 42 and 41, thereby opening the circuit across said terminals. This will result in a partial deenergization of electromagnet 22 whose attraction for trip lever 23 will be overcome by the tension of spring 27, thus opening contacts 31, 38. This outward movement of lever 23 will release lever 17 and permit it to swing upwardly through the action of spring 20 to open the shutters 12 and tilt mercury switch 28 to also break the circuit at this point.

When the liquid coffee has flowed through filter 3 from the upper chamber to the lower chamber of the coffee pot until the level of the liquid is raised sufficiently to cover terminals 41 and 42 to close the circuit across them, the circuit through electromagnet 22 is completed, trip lever 23 is attracted and contact plate 45 closes the open terminals 31, 38, thus completing the circuit through both elements (as shown in Fig. 3) to give low heat. This will keep the coffee hot as long as desired.

In the form shown in Fig. 4, the pump which operates trip lever 23 is controlled by the rise and fall of the fluid pressure within the lower chamber of the coffee pot. Otherwise the operation is quite similar to the operation of the form shown in Figs. 1, 2, and 3.

It is evident that various changes may be resorted to in the form, construction, and arrangement of the several parts without departing from the spirit and scope of my invention, and therefore I do not wish to limit myself to the particular embodiments herein shown and described.

What I claim is:

1. In an electric coffee maker, a casing having a heating chamber, a heating unit therein, said unit comprising a plurality of heating elements, a coffee pot, manually operated means for closing the circuit through the heating unit to give high heat in one of said elements, and automatic means controlled by the contents of the coffee pot for opening the circuit through the heating unit, and for thereafter closing the circuit through the heating unit to give low heat, said automatic means including a pair of spaced terminals in the coffee pot, a switch carried by the hand lever, a trip lever and an electromagnet for operating it.

2. In an electric coffee maker, a casing having a heating chamber, a heating unit therein, said unit comprising a plurality of heating elements, a coffee pot including a lower vessel formed integral with the heater casing, manually operated means for closing the circuit through the heating unit to give high heat in one of said elements, and automatic means controlled by the contents of the coffee pot for opening the circuit through the heating unit, and for thereafter closing the circuit through the heating unit to give low heat, said automatic means including a pair of spaced terminals in the coffee pot, a switch carried by the hand lever, a trip lever and an electromagnet for operating it.

3. In an electric coffee maker, a casing having a heating chamber, a heating unit therein, said unit comprising a plurality of heating elements, a coffee pot, manually operated means for closing the circuit through the heating unit to give high heat in one of said elements, and automatic means controlled by the contents of the coffee pot for opening the circuit through the heating unit, and for thereafter closing the circuit through the heating unit, to give low heat, said automatic means including a switch on the hand lever, a trip lever and a fluid pressure controlled pump for operating it.

4. In an electric coffee maker, a casing having a heating chamber, a heating unit therein, said unit comprising a plurality of heating elements, a coffee pot including a lower vessel formed integral with the heater casing, manually operated means for closing the circuit through the heating unit to give high heat in one of said elements, and automatic means controlled by the contents of the coffee pot for opening the circuit through the heating unit, and for thereafter closing the circuit through the heating unit to give low heat, said automatic means including a switch on the hand lever, a trip lever and a fluid pressure controlled pump for operating it.

5. In an electric coffee maker, a casing having a heating chamber, a heating unit therein, said unit comprising a plurality of heating elements, a coffee pot, manually operated means for substantially closing the access of air to the heating chamber and also for closing the circuit through the heating unit to give high heat in one of said elements, and automatic means controlled by the contents of the coffee pot for opening the circuit through the heating unit, and for thereafter closing the circuit through the heating unit to give low heat and also for substantially opening the access of air to the heating chamber for rapidly cooling it.

6. In a electric coffee maker, a casing having a heating chamber, a heating unit therein, said unit comprising a plurality of heating elements, a coffee pot including a lower vessel formed integral with the heater casing, manually operated means for substantially closing the access of air to the heating chamber and also for closing the circuit through the heating unit to give high heat in one of said elements, and automatic means controlled by the contents of the coffee pot for opening the circuit through the heating unit, and for thereafter closing the circuit through the heating unit to give low heat and also for substantially opening the access of air to the heating chamber for rapidly cooling it.

7. In an electric coffee maker, a casing having a heating chamber, a heating unit therein, said unit comprising a plurality of heating elements, a ventilator for the heating chamber, a coffee pot, manually operated means for closing the ventilator and also for closing the circuit through the heating unit to give high heat in one of said elements, and automatic means controlled by the contents of the coffee pot for opening the circuit through the heating unit, and for thereafter closing the circuit through the heating unit to give low heat and also for opening the ventilator to rapidly cool the heating chamber.

8. In an electric coffee maker, a casing having a heating chamber, a heating unit therein, said unit comprising a plurality of heating elements, a ventilator for the heating chamber, a coffee pot, including a lower vessel formed integral with the heater casing, manually operated means for closing the ventilator and also for closing the circuit through the heating unit to give high heat in one of said elements, and automatic means controlled by the contents of the coffee pot for opening the circuit through the heating unit, and for thereafter closing the circuit through the heating unit to give low heat and also for opening the ventilator to rapidly cool the heating chamber.

CLYDE D. KEATON.